A. H. HALL & T. LOCHER.
Improvement in Metallic Packings for Stuffing-Boxes.
No. 115,463.                                   Patented May 30, 1871.
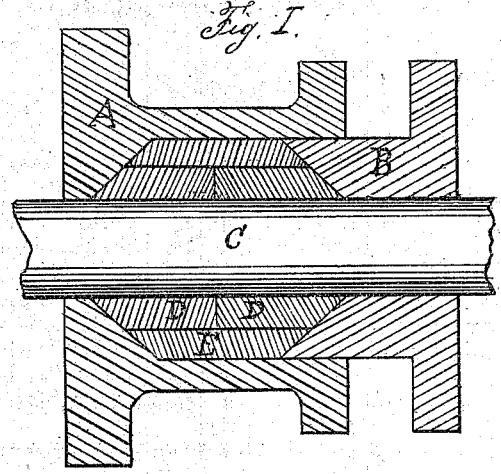
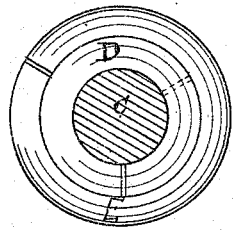
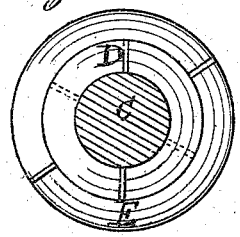
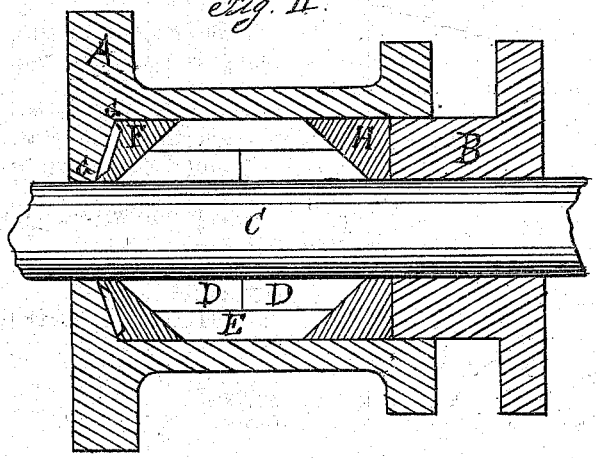
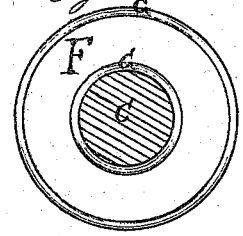
Witnesses
Louis Berteling
Henry Bielar Jr.
Inventors
Albert H. Hall
Theophilus Locher 115,463

UNITED STATES PATENT OFFICE.

ALBERT H. HALL AND THEOPHILUS LOCHER, OF SACRAMENTO, CAL.

IMPROVEMENT IN METALLIC PACKINGS FOR STUFFING-BOXES.

Specification forming part of Letters Patent No. 115,463, dated May 30, 1871.

We, ALBERT H. HALL and THEOPHILUS LOCHER, both of Sacramento, in the county of Sacramento, in the State of California, have jointly invented a certain Improved Metallic Packing for Stuffing-Boxes on Steam-Engines and other Machines, of which the following is a specification:

The nature of our invention consists in introducing behind the metallic packing a ring made of malleable metal, with one side turned to fit the bevel of the packing and the other side provided with projections, which projections will come in contact with the back end of stuffing-box, and adapt themselves to any inequalities, and form a joint to prevent the steam from passing over the packing.

*Description of the Accompanying Drawing.*

Figure I represents a transverse section of the packing on the piston-rod of a steam-engine.

A is the stuffing-box. B, the gland. C, the piston-rod. D D are two inside rings faced up square on one end, and beveled on the other end, and are bored out to fit the piston-rod. E is the outside ring, fitted over the inside rings, and is beveled on both ends, to correspond with the bevel of the inside rings; these rings may be cut straight, as shown in Fig. III, similar to the cut on piston-rings, or they may be cut in several places, as shown in Fig. IV, that they may be put into a stuffing-box without removing the cross-head, care being taken to break joints.

Fig. II represents the packing put into an old stuffing-box.

F is a solid ring, made of malleable metal, beveled to fit the packing on one end, and has projections G G on the other end. This ring is pressed against the wall of the stuffing-box with sufficient force that the projections will adapt themselves to any inequalities which may exist in the back end of the stuffing-box, and thereby prevent the steam from passing over the packing.

Fig. V represents ring F with its projections G G.

The solid ring H in Fig. II is used when the gland cannot be readily beveled to fit the packing. The rings may be turned any desired bevel.

We do not claim the manner of cutting the rings, nor do we claim putting a false ring behind the packing; but

What we claim as our invention is—

The projections G G on ring F, substantially as herein described, and for the purpose set forth.

This specification signed and witnessed this 18th day of February, 1871.

ALBERT H. HALL.
THEOPHILUS LOCHER.

Witnesses:
LOUIS BERTELING,
HENRY BIELAR.